United States Patent [19]

Hexemer, Jr. et al.

[11] Patent Number: 4,929,433

[45] Date of Patent: May 29, 1990

[54] METHOD FOR THE PREPARATION OF SINTERABLE NITRIDES

[75] Inventors: Richard L. Hexemer, Jr., Lewiston; Scott R. Axelson, Frewsburg; Philip H. McCluskey, Alfred; Thomas J. Mroz, Jr., Derby, all of N.Y.

[73] Assignee: Alfred University, Alfred, N.Y.

[21] Appl. No.: 188,236

[22] Filed: Apr. 29, 1988

Related U.S. Application Data

[63] Continuation-in-part of Ser. No. 111,831, Oct. 22, 1987, abandoned.

[51] Int. Cl.$^5$ .................. C01B 21/072; C01B 21/076; C04B 35/58
[52] U.S. Cl. ........................ 423/411; 423/409; 423/410; 423/412; 501/96
[58] Field of Search ............... 501/96, 97, 98; 423/409, 410, 411, 412

[56] References Cited

U.S. PATENT DOCUMENTS

| | | | |
|---|---|---|---|
| 3,908,002 | 9/1975 | Holler | 423/628 |
| 4,107,276 | 8/1978 | Schwetz et al. | 423/290 |
| 4,478,785 | 10/1984 | Huseby et al. | 423/412 |
| 4,495,123 | 1/1985 | Hunold et al. | 501/96 |
| 4,618,592 | 10/1986 | Kuramoto et al. | 423/412 |
| 4,627,966 | 12/1986 | Micheli | 423/610 |
| 4,643,859 | 2/1987 | Mitomo et al. | 501/97 |
| 4,803,183 | 2/1989 | Schwetz et al. | 501/96 |

OTHER PUBLICATIONS

Silverman, "Carbothermal Synthesis of Aluminum Nitride", Advanced Ceramic Materials, vol. 3, No. 4, 1988, pp. 418–419.

M. A. Kuzenkova, A. V. Kurdyumov, G. N. Makarenko, G. S. Oleinik, I. G. Rogovaya, "Structural Changes Accompanying the Sintering of Ultrafine Aluminum Nitrile Powders" Oct., 1981, pp. 35–40.

D. P. Zatkevich, V. F. Berdikov, G. N. Makarenko, T. Ya. Kosolapava, "Mechanical Properties of Materials obtained from an Ultrafine Aluminum Nitride Powder", Dec. 1982, pp. 65–69.

M. A. Kuzenkova, P. S. Kislyi, G. N. Makarenko, D. P. Zyatkevich, T. Ya. Kosolapava, T. N. Miller & Ya. P. Grabis-Title-"Sintering Behavior of Aluminum Nitride Synthesized in Low-Temperature Plasma", Apr. 1978, pp. 25–29.

Primary Examiner—Mark L. Bell
Assistant Examiner—Anthony J. Green

[57] ABSTRACT

Nitride powders of high surface area, uniform small particle size and high purity are prepared by forming in an aqueous medium a homogeneous combination of a soluble or colloidally dispersible compound of a multivalent metal with a water soluble oxygen oxygenated carbonaceous polymer, e.g., by mixing an aluminum or other metal salt with polyacrylic acid or mixing colloidal hydrated alumina, or other such metal oxide, with a water soluble oxygenated carbonaceous polymer such as sucrose or methyl cellulose. The resulting precipitate or gel is dried and calcined in a nitriding atmosphere, forming a nitride powder which is highly suitable for fabrication of ceramic bodies by sintering at lower than conventional temperatures.

21 Claims, No Drawings

4,929,433

METHOD FOR THE PREPARATION OF SINTERABLE NITRIDES

RELATED APPLICATIONS

This application is a continuation-in-part of application Ser. No. 111,831 filed Oct. 22, 1987, now abandoned.

FIELD OF THE INVENTION

This invention relates to nitride powders of high surface area, uniform fine particle size, and high purity, and to methods for their preparation and use. The nitride powders are highly suitable for the fabrication of ceramic bodies by sintering.

BACKGROUND OF THE INVENTION

Ceramic articles prepared from metal nitride powders are of great interest because of their excellent thermal, electrical and mechanical properties. For example, AlN is useful as a ceramic substrate due to its high thermal conductivity, high electrical resistivity, and thermal expansion match with silicon. To prepare a ceramic article, such as a substrate, it is necessary to consolidate the powder into the desired shape and sinter (fire or heat treat) to a dense body. In order to form a dense article it is necessary to start with a powder of fine particle size and a high specific surface area. To achieve the desired thermal conductivity, electrical resistivity and mechanical properties, it is vital that the powder be pure and be able to sinter to theoretical density. Therefore, in order to produce a useful ceramic article of a metal nitride possessing the desired properties, it is necessary to begin with very fine, high surface area, high purity powders.

For the commercial production of aluminum nitride powder two methods are in common use. The direct nitriding method involves exposing metallic aluminum to a nitrogen or ammonia atmosphere at elevated temperatures. Pulverizing of both the original aluminum and the resulting aluminum nitride is required, with the disadvantages of introducing impurities and causing partial oxidation of the nitride. Moreover, unreacted aluminum remains as an impurity, degrading the properties of the AlN. In the second method, i.e., carbothermic reduction, alumina and carbon powders are intimately mixed and heated under nitrogen or ammonia, followed by a second heating step in air to remove residual carbon. Residual alumina remains as an impurity, and milling is usually required to reduce the aluminum nitride particles to a size suitable for fabrication by sintering. Such processes also require high reaction temperature and lengthy reaction times.

A carbothermic process reportedly providing aluminum nitride of somewhat improved purity and small particle size is described by Kuramoto et al., U.S. Pat. No. 4,618,592. Intimate mixing of fine powders of alumina and carbon of high purity in a liquid medium are required before the firing steps. Another carbothermic process is described by Mitomo et al., U.S. Pat. No. 4,643,859. An alkoxide of aluminum is first formed and blended with carbon particles in a suitable solvent. The alkoxide is then hydrolyzed, the solvents removed, and the resulting powder calcined under nitrogen.

Micheli, U.S. Pat. No. 4,627,966, describes the production of sinterable metal-oxygen composition powders. An aqueous solution containing multivalent metal cations is mixed with an aqueous solution of ammonium polyacrylate. The precipitate of metal polyacrylate is separated, the organic portion burned out and the ash calcined in air to produce the desired metal oxide. Holler, U.S. Pat. No. 3,908,002, describes the production of high surface area alpha alumina. A solution in a non-aqueous solvent of an aluminum salt is mixed with a non-aqueous solution of a polycarboxylic acid. The resulting precipitate is thermally decarboxylated in vacuo, heated at above 1000° C. in an inert, dry atmosphere to provide a phase conversion to alpha alumina, and finally heated in an oxygen-containing atmosphere to remove the residual carbon.

The patent to Mitomo et al., U.S. Pat. No. 4,643,859, also points out that known methods for producing aluminum nitride have been: (a) direct nitriding by heating aluminum metal in nitrogen, (b) reduction - nitriding by heating a mixture of alumina and carbon in nitrogen, and (c) reaction of an aluminum compound in the gas phase with nitrogen or ammonia. Each method has disadvantages. Method (a) requires a catalyst and the resulting nitride is impure. In method (b) it is difficult to mix uniformly the starting materials and problems exist with the requirement for excess carbon. Method (c) is expensive and requires large scale apparatus.

All of the prior methods of forming metal nitrides have had drawbacks, including the method of Mitomo et al., which, like method (b) above, uses elemental carbon. It is impossible or exceedingly difficult to obtain a homogeneous mixture of the aluminum species and the carbon species when elemental carbon powder is used.

A distinguishing feature of the applicants' method is that elemental carbon is not used. Instead, a water dispersible or soluble carbon compound is used which mixes intimately and homogeneously with the aluminum compound, in effect, coating the colloidal particles of the aluminum compound. As a result, the nitride powders are of great purity and extremely small particle size. The method and its product differ markedly from the prior art.

SUMMARY OF THE INVENTION

In accordance with the invention, a simple, economical process provides sinterable particles of multivalent metal nitrides, having a surface area of at least about 8 $m^2/g$, and preferably at least about 12 $m^2/g$. In their preferred form the particles have an average particle diameter less than about 0.5 micrometers, most preferably less than about 0.2 micrometers, an oxygen content less than about 3 weight percent, most preferably less than about 2 weight percent, and a metal impurity content less than about 1,000 parts per million by weight (ppm), most preferably less than about 100 ppm.

The method of the invention comprises in an aqueous medium forming a homogeneous combination of a soluble or colloidally dispersible compound of the multivalent metal with a water soluble, oxygenated carbonaceous polymer, adjusting the pH of the medium to form a gel or precipitate of a chemically or electrostatically bonded product of the multivalent metal compound and the polymer, drying said product and calcining the dried product in a nitriding atmosphere.

In a preferred embodiment a multivalent metal salt is prepared by mixing an aqueous solution or dispersion of a compound of a multivalent metal with an aqueous solution or dispersion of a carboxylic acid compound, to form a precipitate of the metal salt of the carboxylic acid compound. The pH at the precipitation stage is adjusted to a level at which only the metal-carboxylic salt precipitates. The precipitate of metal carboxylate is separated and calcined in a nitriding atmosphere, such as nitrogen or ammonia.

In another preferred embodiment a colloidal hydrated metal oxide such as colloidal hydrated alumina is mixed with a water soluble, oxygenated, carbonaceous polymer, such as a sugar or methyl cellulose, in an aqueous medium, the pH is adjusted to form a gel and the latter is dried and then calcined in a nitriding atmosphere.

Although the method of the invention is capable of producing the new form of nitride powders of extremely high surface area, e.g., 8 m$^2$/g or much higher, the novel method also has important advantages even for producing powders of lower surface area. These advantages include short reaction times and low reaction temperatures.

DETAILED DESCRIPTION OF THE INVENTION

The starting materials employed in the embodiment of the method of this invention which is referred to as the "polymeric-chelation" procedure, and which will be discussed first, are (1) water-soluble or water-dispersible multivalent metal compounds; and (2) water-soluble or water-dispersible carboxylic acid compounds or their salts. The aqueous solution or dispersion of the multivalent metal compound is mixed with the aqueous solution or dispersion of the carboxylic compound, preferably in amounts providing at least one equivalent of carboxyl per equivalent of the multivalent metal cations. The pH level of the mixture after mixing should be such that the precipitation of undesirable metal salts, e.g., hydroxides, oxides, nitrates or chlorides, is avoided. The resulting precipitate is separated, e.g. by decantation, centrifugation or filtration, optionally washed, and dried. The resulting metal carboxylate is then calcined in a nitriding atmosphere such as nitrogen, optionally followed by oxidative heating to remove residual carbon. A suitable heating schedule is detailed in the examples hereinafter.

An important advantage of the invention is that the addition of particulate carbon is unnecessary, in contrast to the existing carbothermic processes. Although we do not wish to be bound by theoretical explanations of the mechanism, we believe that the multivalent metal cations are linked to the carboxyl groups at an atomic level, via the oxygen atoms of the carboxyl groups. The intermixing of the reactants at the atomic level in the method of the invention (as distinguished from the mechanical particulate mixing in the carbothermic process) is believed to permit nitridation to be completed at a lower maximum temperature and in shorter times than in existing processes, thus avoiding undesired particle growth and sintering. The resulting nitride particles are of extremely small and uniform particle size, high surface area, and high purity. They are thus highly suited for fabrication of ceramic articles by sintering, e.g. by hot pressing or pressureless methods, and are indeed found to sinter at relatively low temperatures to bodies of theoretical density. Furthermore, they can be sintered without sintering aids or with no more than a low concentration of sintering aid, thus yielding a sintered article of high purity and consequently, high thermal conductivity.

The multivalent metal nitrides produced by the method of the invention have a particle surface area of at least about 8 m$^2$/g, and preferably at least about 12 m$^2$/g, average particle diameter less than about 0.5 micrometers, most preferably less than about 0.2 micrometers, an oxygen content about 3.0 weight percent, most preferably less than about 2.0 weight percent, and a metal impurity content (i.e., metals other than the metal(s) of the desired nitride) of less than about 1,000 ppm, most preferably less than about 100 ppm. These properties can be measured by well-known standard methods. For example, surface area can be determined by nitrogen desorption according to the method of Brunauer, Emmett and Teller (the "BET" method). Particle size is determined by measurement of scanning electron micrographs, and oxygen content is determined from the metal oxide concentration in the powder, if any. The metal impurity content is expressed as elemental metal content (which may be present as free metals or as metal compounds) and can be measured by atomic absorption or x-ray fluorescence.

Particularly significant sinterable nitrides having these properties and made by the method of the invention are aluminum nitride, cerium nitride, yttrium nitride, zirconium nitride, boron nitride, titanium nitride, silicon nitride and certain mixed nitride substances such as sialons. The latter are modified forms of silicon nitride having aluminum substituted in some of the silicon sites and oxygen substituted in some of the nitrogen sites.

The method of the invention can make use of any water-soluble or water-dispersible compounds of multivalent metals, such as aluminum, cerium, yttrium, zirconium, silicon or titanium or their mixtures. Examples of such compounds include, e.g., the metal halides, nitrates and alkoxides, as well as water-dispersible oxides such as boehmite (pseudoboehmite). Specific useful multivalent metal compounds include aluminum nitrate, aluminum chloride, yttrium nitrate, aluminum sec-butoxide and boehmite. Specific useful water-soluble or water-dispersible carboxylic acid compounds include compounds such as polymers of acrylic acid, methacrylic acid, carboxymethylcellulose, butenoic acid, sorbic acid, crotonic acid, maleic acid, itaconic acid or their salts, provided that they are water-soluble or dispersible. Molecular weights of the polymers are limited only by convenience of handling.

The heating times and temperatures required for nitridation will vary with the composition of the reactants. However, as noted above, the atomic scale intermixing of the reactants provided by the process of the invention will permit nitridation to be completed at lower maximum temperatures and shorter times than required in existing commercial processes, with resulting improvement in product particle size and uniformity (e.g. reduced neck growth and sintering).

The process of the invention involves simple operations and makes use of relatively inexpensive, readily available starting materials. The disadvantages of the carbothermic reduction method, such as the need for finely divided solid reactants, arduous mechanical milling and pulverizing with concomitant risk of contamination, and need for high calcining temperatures for long periods of time, are avoided. As already noted, the nitride products of the invention are of high surface area, uniform fine particle size, and high purity, and thus highly suitable for fabrication by sintering. The process is also very adaptable, giving the ability to modify surface area and particle size by adjusting the nitridation conditions.

An important advantage of our method and product is that because of the high surface area of the nitride powders, sintered articles of substantially theoretical density (i.e., at least about 99 percent of theoretical density) can be prepared at relatively low temperatures and short times. For the example of aluminum nitride, a temperature as low as about 1600° C. and a time as short as about three hours can be used. In addition, low levels of sintering aids are adequate, resulting in greater product purity and thus improved properties such as thermal conductivity and mechanical strength.

The example which follows illustrates the preparation of aluminum nitride (AlN) by the method of the invention using aluminum chloride hexahydrate ($AlCl_3 \cdot 6H_2O$) as the source of the multivalent metal cation.

EXAMPLE I

A solution was made of 50.0 g of ($AlCl_3 \cdot 6H_2O$) in 207.1 mL distilled water. The amount of polymeric acid was then calculated to achieve a final molar ratio of $Al^{+3}$/COOH of 0.33. In this example, 106.9 g of B. F. Goodrich K-732 polyacrylic acid was used (molecular weight about 5100, 50 percent solids), diluted by addition of 622.0 mL of distilled water. The polymer solution was added to the aluminum ion solution by mixing with a high torque propeller mixer. No precipitation occurred, and the pH was approximately 1.9. Concentrated ammonium hydroxide was then added to raise the pH to approximately 3.0. As the pH was raised a white gelatinous material was formed. This material was allowed to settle overnight and the mother liquor decanted. The material was then washed with distilled water several times and allowed to dry overnight at 110° C.

Nitridation was carried out using the following schedule in a controlled atmosphere, programmable electric furnace, with nitrogen flow rate at 0.35–0.40 L/min:

| | |
|---|---|
| 20–1100° C. | 10° C./min |
| 1100° C. | 60 min hold |
| 1100–1450° C. | 10° C./min |
| 1450° C. | 180 min hold |
| 1450–20° C. | 10° C./min |

The nitride was then heated to 500° C. in air for one hour to remove excess carbon.

The BET gas absorption method was used to characterize the surface area of the resulting aluminum nitride. The surface area was found to be 22 $m^2/g$ as compared to values for commercially supplied AlN of 1–5 $m^2/g$ X-ray diffraction analysis showed that the AlN produced was phase pure with no detectable $Al_2O_3$ such as is commonly seen in AlN produced by the carbothermic reduction process. Scanning Electron Micrograph (SEM) analysis showed an average particle size of about 0.15 micrometers. X-ray peak broadening confirmed that the powder was of sub-micron size.

A sample of the aluminum nitride was sintered. As a sintering aid, 1.00 weight percent CaO (added as $CaCO_3$) was added to the AlN and the mixture milled one hour in heptane using a ball mill having an interior surface of polyethylene and milling medium surfaces of alumina. The resulting powder was separated, dried and pressed at 280 MPa (40,000 psi) in a cylindrical die to form disks of 9 mm diameter and 2 mm thickness. The disks were sintered in flowing nitrogen at 0.5 L/min and atmospheric pressure using the following schedule:

| | |
|---|---|
| 20–1900° C. | 20° C./min |
| 1900° C. | hold 60 min |
| 1900–20° C. | 10° C./min |

The resulting sintered disks were of substantially theoretical density, of uniform microstructure, and were translucent.

Three additional samples of the same aluminum nitride powder were mixed, respectively, with zero, 0.5 and 1.0 weight percent of CaO (added as $CaCO_3$) sintering aid and sintered in flowing nitrogen at atmospheric pressure using the following schedule:

| | |
|---|---|
| 20–1700° C. | 20° C./min |
| 1700° C. | hold 180 min |
| 1700–20° C. | 10° C./min |

In each case the resulting sintered disks were of substantially theoretical density. Thus, a product of theoretical density can be made from the high surface area powder of the invention with or without sintering aid. At least a small amount of sintering aid is useful when a translucent sintered article is desired.

In the next example, dispersible alumina was used in place of ($AlCl_3 \cdot 6H_2O$) in the preparation of aluminum nitride.

EXAMPLE II

"Disperal" (a boehmite, AlO(OH) $XH_2O$, also known as pseudoboehmite, as supplied by Remet Chemical Corp.), 1.5 g, was mixed in 10.0 mL distilled water. The pH was adjusted with 6N HCl to form a stable dispersion, at which point the pH was approximately 1.5. The dispersion was then centrifuged to remove a small amount of undispersed material. A solution was prepared by mixing 10.0 g of polyacrylic acid (B. F. Goodrich K-732) with 20.0 mL distilled water. The pH was adjusted to 5.0 with concentrated $NH_4OH$. This solution was then added to the "Disperal" dispersion while mixing. The pH was observed to be 5.0. The pH was then adjusted with 6N HCl to a final value of 1.5. The mixture was dried overnight at 110° C. and the resulting solid ground to a powder. Nitridation then was carried out using the calcination schedule described for Example I, to provide an AlN powder having a surface area of 12 $m^2/g$ and similar X-ray diffraction properties to those of the product of Example I. Average particle size was 0.1 micrometer.

In a third example, aluminum sec-butoxide was used in the preparation of aluminum nitride.

EXAMPLE III

Aluminum sec-butoxide, 5.5 g, was diluted with 5.0 mL sec-butyl alcohol. A second solution was prepared by mixing 10.0 g of the polyacrylic acid with 20.0 mL distilled water. The pH was then adjusted to 5.0 with $NH_4OH$. The aluminum sec-butoxide solution was then added to the polymer solution while mixing. The pH was observed to be 5.0. The precipitate that formed was mixed for 1 hour to ensure complete hydrolysis of the aluminum sec-butoxide. The pH was then adjusted with HCl until the value fell to 1.5. The contents were dried overnight at 110° C. and ground to form a powder. Nitridation was then carried out using the calcination schedule described in Example I, to provide an AlN having a surface area of 8 m²/g and similar x-ray diffraction properties to those of the product of Example I. SEM micrographs revealed the average particle diameter to be less than 0.1 micrometer.

EXAMPLE IV

A solution was made by dissolving 7.6 g of yttrium nitrate hexahydrate $(Y(NO_3)_3 \cdot 6H_2O)$ in 100.0 mL distilled water. The amount of polymeric acid was then calculated to achieve a final molar ratio of $y^{+3}/COOH$ of 0.33. In this example, 8.7 g of polyacrylic acid (B. F. Goodrich K-732) was directly added to the above solution under stirring action. No precipitation occurred until the pH was raised to about by dropwise additions of $NH_4OH$. The gel precipitate was dried for about 24 h at 60° C.

Nitridation was carried out using the following schedule in a controlled atmosphere, programmable electric furnace, with a nitrogen flow rate of 0.35–0.40 L/min:

| | |
|---|---|
| 20–1100° C. | 10° C./min |
| 1100° C. | 60 min hold |
| 1100–1500° C. | 10° C./min |
| 1500° C. | 180 min hold |
| 1500–20° C. | 10° C./min |

X-ray diffraction analysis showed that phase pure yttrium nitride (YN) was formed by the process.

Holler, U.S. Pat. No. 3,908,002, cited above, described the preparation of high surface area alpha alumina by a procedure involving the reaction of an aluminum salt with a polycarboxylic acid (but in a non-aqueous solution), followed by heat treatments which include a step at a high enough temperature to cause a phase change to alpha alumina. This step is carried out in an inert atmosphere, such as under nitrogen. Holler's product, however, is an oxide rather than a nitride. The following comparative example was prepared using a process similar to that of Holler with materials and a calcination schedule judged most likely to yield aluminum nitride.

COMPARATIVE EXAMPLE

The experimental formulation was based on a ratio of one carboxyl per equivalent of aluminum. Solution 1 was prepared by mixing 20.4 g of aluminum acetate, 30.0 mL of ethanol, and 6.5 mL of distilled water. Solution 2 consisted of 4.37 g of polyacrylic acid (B. F. Goodrich K-732). Solution 2 was added to Solution 1 and stirred for one hour, forming a precipitate. After settling for one hour the excess liquid was decanted and the precipitate dried in air at 60° C.

The fine, white precipitate powder was then calcined in a nitrogen atmosphere. The material was heated to 1100° C. at 10° C./min and held for one hour. The temperature was then raised to 1450° C. at 10° C./min, where it was held for 5 h (within the temperature ranges described by Holler, but held for longer periods of time). Heating and cooling occurred in nitrogen at a flow of 1.0 L/min.

The resulting powder was characterized by X-ray diffraction analysis. The only material detected was alpha aluminum oxide, $Al_2O_3$; no traces of aluminum nitride were found. Since aluminum hydroxide, $Al(OH)_3$, is insoluble in most non-aqueous solutions, it appears that the precipitation process described by Holler forms $Al(OH)_3$ in a steric association with the polycarboxylic compound, rather than an aluminum polycarboxylate as in the method of the present invention.

The foregoing examples I–IV have demonstrated the embodiment of applicants' invention known as the polymeric-chelation procedure wherein electrostatic attraction of a polymer to an aluminum or yttrium source is utilized to obtain a highly homogeneous metal compound/carbon mixture.

Further examples of species of that embodiment and examples of the embodiment known as the sol-gel procedure are provided below. The latter examples illustrate the preparation of certain sol-gel precursors and the preparation of nitrides from these precursors.

Chemical precursors to be nitrided in accordance with the invention were prepared by the sol-gel procedure and by the polymeric-chelation procedure as follows:

SOL-GEL PREPARATION

In the following sol-gel precursor examples (V and VI), a pseudoboehmite $(AlO(OH) \cdot XH_2O)$ was used as the alumina source. The pseudoboehmite was gelled in various carbon-containing water based systems in order to obtain a highly homogeneous alumina/carbon mixture. The carbon sources were sucrose and methylcellulose. General procedures for each mix are detailed in the examples.

EXAMPLE V - DISPERSIBLE ALUMINA/SUCROSE

The precursor was prepared by gelling colloidal hydrated alumina in a sucrose $(C_{12}H_{22}O_{11})$ solution. A stable colloidal hydrated alumina dispersion was prepared by mixing 5.0 g "Disperal" pseudoboehmite $(AlO(OH) \cdot XH_2O)$ in 20.0 ml distilled $H_2O$. The pH was adjusted with 6N HCl to form a stable dispersion, at which point the solids content was about 20 wt.% and the pH was approximately 1.5. The dispersion was centrifuged at 1500 RPM for 5 minutes and the decantate removed for use. This step was necessary to remove any large particles of undispersed material. At this point the decantate solids content was slightly lower than the solids content of the original dispersion, meaning excess carbon would be available for the formation of AlN. Separately a solution was prepared by dissolving 4.88 g sucrose in 15 ml distilled $H_2O$ and 5 mL ethanol. The sucrose solution was then added to the "Disperal" decantate while stirring and 6N HCl was added until a gel formed at a pH of approximately 1.0.

EXAMPLE VI - ALUMINA/METHYLCELLULOSE

This precursor was prepared by combining colloidal hydrated alumina and methylcellulose. Again a stable colloidal hydrated alumina dispersion was prepared as in Example V. Separately a solution was prepared by adding 9.19 g methylcellulose to 368 mL distilled $H_2O$ while stirring rapidly. When all the methylcellulose was dissolved the viscosity increased significantly. At this time it was added to the "Disperal" decantate while stirring and 6N HCl was added until the pH was about 1.5 at which point the viscosity was sufficient to prevent migration of materials.

POLYMERIC-CHELATION PREPARATION

In a further series of precursor examples, electrostatic attraction of a polymer to an aluminum source was utilized as in Examples I–IV to obtain a highly homogeneous alumina/carbon mixture. Polyacrylic acid $(CH_2{:}CHCO_2H)_n$, containing ionized $COO^-$ groups was used as a carbon source that was electrostatically attracted to colloidal hydrated alumina particles or chelated with aluminum cations in a water medium. The aluminum sources consisted of dispersible alumina, aluminum alkoxides, and aluminum salts.

EXAMPLE VII - DISPERSIBLE ALUMINA/POLYACRYLIC ACID

This precursor was prepared by electrostatically attracting polyacrylic acid chains to the surface of colloidal hydrated alumina. A dispersion was prepared by mixing 5.0 g "Disperal" in 33.5 mL distilled $H_2O$. The pH was adjusted with 6N HCl to form a stable dispersion, at which point the pH was approximately 1.5. The dispersion was then centrifuged for 5 minutes and the decantate removed for use. A separate solution was prepared by adding 33.5 g of polyacrylic acid, M.W. 5100, 50 wt.% solids (Goodnite K-732 of B. F. Goodrich Co.) to 67.0 mL distilled $H_2O$ at which point the solids content was about 17 wt.% and the pH was about 3.0. The Disperal decantate was then added to the polyacrylic acid solution while stirring at which time no reaction occurred. The pH of the solution at this time was approximately 1.7. A precipitate was then formed by increasing the pH with $NH_4OH$ until the pH was approximately 3.0. The material was stirred for one hour, allowed to sit for 24 hours, and restirred for one hour to ensure that reaction go to completion.

EXAMPLE VIII - ALUMINUM ALKOXIDE/POLYACRYLIC ACID

This precursor was prepared by electrostatically attracting polyacrylic acid chains to the surface of colloidal hydrated alumina. Aluminum sec-butoxide was used to form a stable colloidal hydrated alumina dispersion. To prepare the dispersion, 18.0 g of aluminum sec-butoxide was diluted with 17.0 ml sec-butanol, and then added to 34.0 ml distilled $H_2O$ to begin hydrolysis. The pH was then lowered to approximately 1.5 by adding 6N HCl. The contents were then held at 60° C. for 12 hours to complete peptization, at which time the dispersion became clear. The polyacrylic acid solution was prepared by repeating the procedures of Example VII. The colloidal dispersion was then added to the polyacrylic acid solution while stirring at which time no reaction occurred. The pH at this time was approximately 1.7. A precipitate was then formed as before by increasing the pH to 3.0.

EXAMPLE IX - ALUMINUM SALT/POLYACRYLIC ACID

This precursor was prepared by chelating aluminum cations to ionized $COO^-$ groups on polyacrylic chains. A solution containing $Al(H_2O)_6^{+3}$ species was prepared by dissolving 10.0 g $AlCl_3 \cdot 6H_2O$ in 40.0 ml distilled $H_2O$. The pH of the solution was approximately 1.7 after all the salt was dissolved. A separate solution was prepared by adding 20.0 g "Goodrite K-732" polyacrylic acid to 80.0 ml distilled $H_2O$ at which time the solids content was about 10.0 wt.% and the pH was about 3.3. The amount of polyacrylic acid to be used was calculated to achieve a final molar ratio of $Al(H_2O)_6^{+3}$ of 0.33. (This ratio was used to ensure that there were enough carboxyl groups in the solution to balance charge with the aluminum species. The aluminum salt solution was then added to the polyacrylic acid solution while stirring at which time no reaction occurred. The pH at this time was approximately 1.7. A precipitate was then formed by raising the pH to 3.0.

EXAMPLE X - DRYING AND NITRIDATION PROCEDURES

Each of the gels and precipitates of Examples V–IX was dried at 110° C. for 24 hours. The solid remaining was then crushed using a porcelain mortar and pestle to form a powder. Prior to nitridation the powders were stored at 80° C. to prevent hydration of the materials. Nitridation was conducted in a tungsten mesh resistance furnace capable of vacuum, inert, or reducing atmospheres. Precursor powders were loaded in a cylindrical graphite crucible measuring 63.5 mm in diameter and 24.5 mm in height which was lined with graphite foil. Preliminary runs were conducted in flowing nitrogen with a flow rate of 0.5 l/min. Prepurified grade nitrogen with a minimum purity of 99.998 and containing 3 ppm $H_2O$ or less, and 5 ppm $O_2$ or less was used. The heating schedule was: 10° C./min. to 1100° C., 60 min. hold, 10° C./min. to 1450° C., 180 min. hold, and 10° C./min. to R.T.

Powders obtained after nitridation of the sol-gel and the polymeric-chelation precursors of Examples V–IX were oxidized at 650° C. to remove excess carbon. Powders were then analyzed using X-ray diffraction to determine AlN or residual $Al_2O_3$ content. Using these results the following steps were taken to increase the AlN yield.

A. Elevated Nitridation Temperature

The precursor of nitrided powder containing residual $Al_2O_3$ (namely, the sol-gel precursor using methylcellulose) was subjected to increased nitridation temperatures in an effort to increase AlN yield. The heating schedule was identical with the previous schedule, except the upper temperature was increased from 1450° C. to 1500° C. As before prepurified nitrogen was used with a flow rate of 0.5 L/min.

B. Increased Carbon Content

A second step taken to increase AlN yield was to increase the initial carbon content in the precursors in order to ensure that the molar ration of the carbonaceous polymer to the metal compound was sufficient to supply carbon in a stochiometric excess for reduction of the metal and avoidance of metal oxide in the product. In the sol-gel precursor utilizing methylcellulose as a carbon source the amount of methylcellulose was doubled in an effort to eliminate residual $Al_2O_3$. The methylcellulose precursor was prepared as in Example VI except the amount of methylcellulose was now 18.38 g. The precursor was then dried and nitrided according to the schedule shown in Example X. The amount of carbon in the precursor utilizing sucrose was left unchanged because of the 100% yield of AlN at the higher nitridation temperature.

The carbon content (or amount of polyacrylic acid) from the polymeric-chelation precursors was high because of the excess amount of polyacrylic acid required to achieve effective chelation of the aluminum sources. Thus, the polymeric-chelation precursors were left unchanged.

C. Polymeric-Chelation Modified pH Treatment

Because chelation depends on COO⁻ ionization which is a function of pH for polyacrylic acid, the pH was varied to evaluate any changes that might occur. In the polymeric-chelation preparations of Examples VII–IX the pH of the polyacrylic acid/aluminum salt source after mixing was adjusted to approximately 3.0. To study the effects of pH, precursors were prepared in the same manner as in Example IX, except the final pH after mixing was adjusted to 5.0 in one case and to 8.0 in another. Precursors were dried and nitrided according to the schedule shown in Example X.

The precursors were evaluated during and after the nitridation treatment using several characterization techniques in an effort to determine reaction paths leading to the formation of AlN. Thermogravimetric analysis (TGA), differential thermal analysis (DTA), and x-ray diffraction (XRD) were used.

The final nitrided powders were evaluated using scanning electron microscopy (SEM), BET gas absorption, and oxygen content analysis to compare final properties. A series of sintering tests was also conducted on what appeared to be the best powder.

SINTERING PROCEDURES

Powders obtained from the polymeric-chelation process using an aluminum salt as an aluminum source were subjected to a series of sintering tests. One gram batches of AlN powder were ball milled in heptane for one hour with 0, 0.5, and 1.0 wt.0% of CaO (added as $CaCO_3$) sintering aid. A 250 ml. polyethylene container filled about one third with 0.5 inch cylindrical alumina media was used. After milling the slurry was dried and lightly crushed to form a fine powder. Powder was pressed at 280 MPa (40,000 psi) in a cylindrical die to form disks of 12.5 mm diameter and 2.0 mm thickness. A Centorr (model M-60) tungsten mesh resistance furnace was used for sintering. Disks were placed on a polished 98% AlN setter which was set in a cylindrical graphite crucible. The disks were then covered with graphite foil, followed with a thin layer of AlN powder. Sintering was conducted in flowing prepurified grade nitrogen with a flow rate of 0.5 l/min. The heating schedule was: 20° C./min. to 1700° C., 180 min. hold, and 10° C./min. to room temperature.

Sintered disks were then tested for bulk properties such as bulk density, apparent porosity, and percent theoretical density by the Archimedes Balance Technique, ASTM C373-72(82). Fracture surfaces were examined with the scanning electron microscope (SEM) to determine grain size and morphology.

RESULTS OBSERVED IN TESTS OF SOL-GEL PRECURSORS OF EXAMPLES V AND VI

In preparing the precursors by gelation of colloidal hydrated alumina it appears that the carbon source influences the appearance of the gel before and after drying. Gels formed with only dispersible alumina become translucent glassy solid after drying. The precursors containing sucrose and methylcellulose dried to form a brown glassy solid and a brown fibrous solid, respectively, suggesting soluble carbon sources also have a effect on the properties of the gel.

RESULTS OBSERVED IN TESTS OF POLYMERIC-CHELATION PRECURSORS OF EXAMPLES VII-IX

The methods used to prepare the precursors consisted of an electrostatic attraction and a chelation technique. Each precursor formed a white precipitate which converted to a chalk-like substance during drying. The precursors prepared by electrostatic attraction of the polyacrylic acid to colloidal hydrated alumina were yellow-white in color after drying which suggests free polymer in solution. However, the precursor prepared by chelating aluminum cations with polyacrylic acid was white in color after drying suggesting chelation occurred with all the polymer in solution.

In the electrostatic attraction technique it is believed that polyacrylic acid chains are attracted to the surface of colloidal hydrated alumina. The polyacrylic acid chains become charged above a pH of about 2.0 when the carboxyl (COOH) groups ionize to form COO⁻ side groups. At this point the chains are attracted to the positive surface of the colloidal hydrated alumina. This is supported by the fact that a precipitate forms in this system above a pH of 2.0. The precipitate is believed to be formed by polyacrylic acid bridges among the alumina particles.

In the chelation technique it is believed that aluminum species (primarily $Al(H_2O)_6^{+3}$) are chelated with COO⁻ side groups located on the polyacrylic acid chains. For this to occur the pH of the mixture should remain below 3.3 to ensure that $Al(OH)_3$ does not form. If $Al(OH)_3$ forms then the electrostatic attraction process mentioned above will become involved. In the chelation process aluminum species with positive charges are believed to cause cross-linking between polyacrylic acid chains causing the thick white precipitate to form.

All of the precursor combinations nitrided at 1450° C. appeared as a fluffy dark black powder except for the dispersible alumina/methylcellulose powder which appeared light black. After the powders were oxidized at 650° C. to remove excess carbon all the powders appeared light gray in color. X-ray diffraction results showed only AlN in all powders except for those prepared from the methylcellulose precursors, which contained residual $Al_2O_3$.

SOL-GEL OPTIMIZATION

The sol-gel precursor based on dispersible alumina/methylcellulose with the methylcellulose (or carbon) content doubled was dark black after nitriding at 1450° C. X-ray diffraction results showed only AlN in this powder. Thus, residual alumina in the original nitrided precursor was reduced by increasing the amount of methylcellulose and, hence, the carbon content to well above the stochiometric amount for the reduction reaction.

POLYMERIC-CHELATION MODIFIED pH TREATMENT

The polymeric-chelation precursors, prepared except with altered final pH values of 5.0 and 8.0 instead of 3.0, were both dark black after nitriding at 1450° C. X-ray diffraction results showed single phase AlN powder was formed. Thus, phase pure AlN can be formed regardless of pH in the range of 3-8. Above pH 3.5, the $Al(H_2O)_6^{+3}$ species disappears and $Al(OH)_3$ particles are precipitated. At this point it is believed that the polyacrylic acid is electrostatically attracted to the positive surface of the hydrate alumina. This is valid for pH values less than 9.0, the point of zero change (Pzc) for alumina. Another possible explanation is that $Al(OH)_3$ does not form and the aluminum species in solution continues to be chelated with the ionized carboxyl groups on the polyacrylic acid chains. In any event, applicants do not wish to be bound by theoretical explanations. Test results show that the formation temperature for AlN decreases from greater than 1450° C. to about 1360° C. when colloidal hydrated alumina is replaced with an aluminum salt and the carbon source is soluble and capable of being attracted to the aluminum source, (e.g. the carbon source is anionic). By changing to a soluble nonionic and then to a soluble anionic carbon source with the colloidal hydrated alumina, the formation temperature appears to decrease below 1450° C. Thus, reduction and nitridation of alumina in the sol-gel powders utilizing colloidal hydrated alumina is estimated to occur up to 100 degrees higher than the polymeric-chelation powders which utilize aluminum salts. This effect is presumably due to the near atomic scale separation of the aluminum, oxygen, and carbon species obtained in the polymeric-chelation precursors which results in shorter diffusion distances for the reduction of the alumina or the removal of oxygen from the system.

SINTERING RESULTS

The nitride powders derived from aluminum salt-/polyacrylic acid as in Example IX were sintered at 1700° C. Disks from the powder containing 0.0, 0.5, and 1.0 wt.% CaO sintering aid appeared opaque gray, translucent gray, and translucent gray-white, respectively. All disks showed 0.0% apparent porosity and were more than 98% of theoretical density (3.26 g/cc). The grains in the disk with 0.5 and 1.0 wt.% Cao added are larger and more angular than in the disk with no sintering aid. It appears the addition of sintering aid enhances grain growth at these low sintering temperatures by formation of a CaO—Al$_2$O$_3$ liquid phase at the grain boundaries.

Variations and modifications of the above-described invention may suggest themselves to those skilled in the art. Accordingly, the above description should not be taken in a limiting sense.

We claim:

1. A method of preparing a sinterable aluminum nitride powder which comprises
    (a) mixing an aqueous solution or aqueous dispersion of an aluminum salt or of colloidal hydrated alumina with an aqueous solution or aqueous dispersion of a carboxylic acid polymer to form a precipitate,
    (b) drying the precipitate, and
    (c) calcining the precipitate in a nitriding atmosphere.

2. A method of claim 1 wherein the nitriding atmosphere comprises nitrogen.

3. A method of claim 1 wherein the nitriding atmosphere comprises ammonia.

4. A method according to claim 1 wherein the polymer is polyacrylic acid, polymethacrylic acid or carboxymethylcellulose and the precipitate is calcined in an atmosphere of flowing nitrogen.

5. A method according to claim 1 wherein the nitriding temperature is no higher than 1500° C. and the nitriding time does not exceed 3 hours.

6. A method according to claim 4 wherein the precipitate is formed by mixing an aqueous solution of an aluminum compound with the polymer solution or dispersion and adjusting the pH during the precipitation to a level at which only aluminum carboxylate precipitates.

7. A method according to claim 6 wherein the aluminum compound is aluminum chloride or aluminum nitrate and the resulting sinterable aluminum nitride powder has a surface area of at least 15 m$^2$/g and an average particle diameter less than 0.2 micrometers.

8. A method according to claim 1 wherein the aluminum compound is an aluminum alkoxide and the resulting sinterable aluminum nitride powder has a surface area of at least 8 m$^2$/g and an average particle diameter less than 0.2 micrometers.

9. A method according to claim 4 wherein the precipitate is formed by mixing an aqueous dispersion of a dispersible alumina with the polymer solution or dispersion and adjusting the pH during the precipitation to a level at which only the aluminum carboxylate precipitates.

10. A method according to claim 9 wherein the resulting sinterable aluminum nitride powder has a surface area of at least 8 m$^2$/g and an average particle diameter less than 0.2 micrometers.

11. A method of preparing a sinterable powder of a nitride of a multivalent metal selected from the group consisting of aluminum, cerium, yttrium, zirconium and titanium which comprises
    (1) in an aqueous medium forming a homogeneous combination of
        (a) a soluble or colloidally dispersible compound of the multivalent metal with
        (b) a water soluble, oxygenated carbon compound which, when mixed therewith, is capable of forming a chemically or electrostatically bonded product with said metal compound,
    (2) recovering a homogeneous gel or precipitate of said chemically or electrostatically bonded product of the multivalent metal compound and the carbon compound,
    (3) drying said product and
    (4) calcining the dried product in a nitriding atmosphere.

12. A method according to claim 11 wherein the nitriding atmosphere comprises nitrogen.

13. A method according to claim 11 wherein the nitriding atmosphere comprises ammonia.

14. A method according to claim 11 wherein the carbon compound is a carboxylic acid polymer.

15. A method according to claim 14 wherein the carboxylic acid polymer is polyacrylic acid.

16. A method according to claim 11 wherein the carbon compound is polyacrylic acid.

17. A method according to claim 11 which comprises mixing an aqueous dispersion of colloidal hydrated alumina with an aqueous solution of polyacrylic acid, the amount of polyacrylic acid being sufficient to provide a stoichiometric excess of carbon, maintaining the pH of the resulting mixture in the range of 3 to 8 to form a precipitate and calcining the dried precipitate in a nitrogen atmosphere at a temperature of at least about 1360° C.

18. A method according to claim 11 wherein the ratio of the carbon compound to the multivalent metal compound is sufficient to supply carbon in a stochiometric excess for reduction of the metal and avoidance of metal oxide in the product.

19. A method according to claim 11 wherein the multivalent metal compound is colloidal hydrated alumina.

20. A method according to claim 19 wherein the oxygenated carbon compound is a sugar or methyl cellulose.

21. A method according to claim 20 wherein the sugar is sucrose.

* * * * *